US008434398B2

(12) United States Patent
Dutilleul

(10) Patent No.: US 8,434,398 B2
(45) Date of Patent: May 7, 2013

(54) METHOD OF CONTROLLING A HYDRAULIC ACTUATOR

(75) Inventor: Benoit Dutilleul, Leiden (NL)

(73) Assignee: Agence Spatiale Europeenne, Paris Cedex (FR)

( * ) Notice: Subject to any disclaimer, the term of this patent is extended or adjusted under 35 U.S.C. 154(b) by 1007 days.

(21) Appl. No.: 12/385,377

(22) Filed: Apr. 7, 2009

(65) Prior Publication Data

US 2009/0255247 A1 Oct. 15, 2009

(30) Foreign Application Priority Data

Apr. 8, 2008 (FR) ..................................... 08 01920

(51) Int. Cl.
*F01L 25/08* (2006.01)
*G01M 7/00* (2006.01)

(52) U.S. Cl.
USPC ............................................... 91/275; 73/665

(58) Field of Classification Search .................... 91/275; 73/665

See application file for complete search history.

(56) References Cited

U.S. PATENT DOCUMENTS 3,488,999 A 1/1970 Catania
4,342,255 A 8/1982 Watanabe et al.
4,901,624 A 2/1990 Feuser

*Primary Examiner* — F. Daniel Lopez
(74) *Attorney, Agent, or Firm* — Clark & Brody

(57) ABSTRACT

A control method for controlling a hydraulic actuator to impart oscillatory excitation to a load, the actuator comprising at least one hydraulic chamber and a movable member capable of moving in said chamber between two extreme positions under the action of a liquid under pressure, wherein the method comprises the steps consisting in: determining an operating point for said actuator, which operating point corresponds to a rest position of said movable member; applying a hydraulic command to bring said movable member into correspondence with said rest position; and applying a hydraulic command to cause said movable member to perform reciprocating movement about said rest position, said reciprocating movement being adapted to apply a desired excitation to said load; the rest position of said movable member being selected to be significantly off-center relative to said extreme positions. Advantageously, said rest position is selected to be as close as possible to one of said extreme positions of the movable member, taking account of the movement amplitude required of the piston to impart a desired excitation to said load.

22 Claims, 2 Drawing Sheets

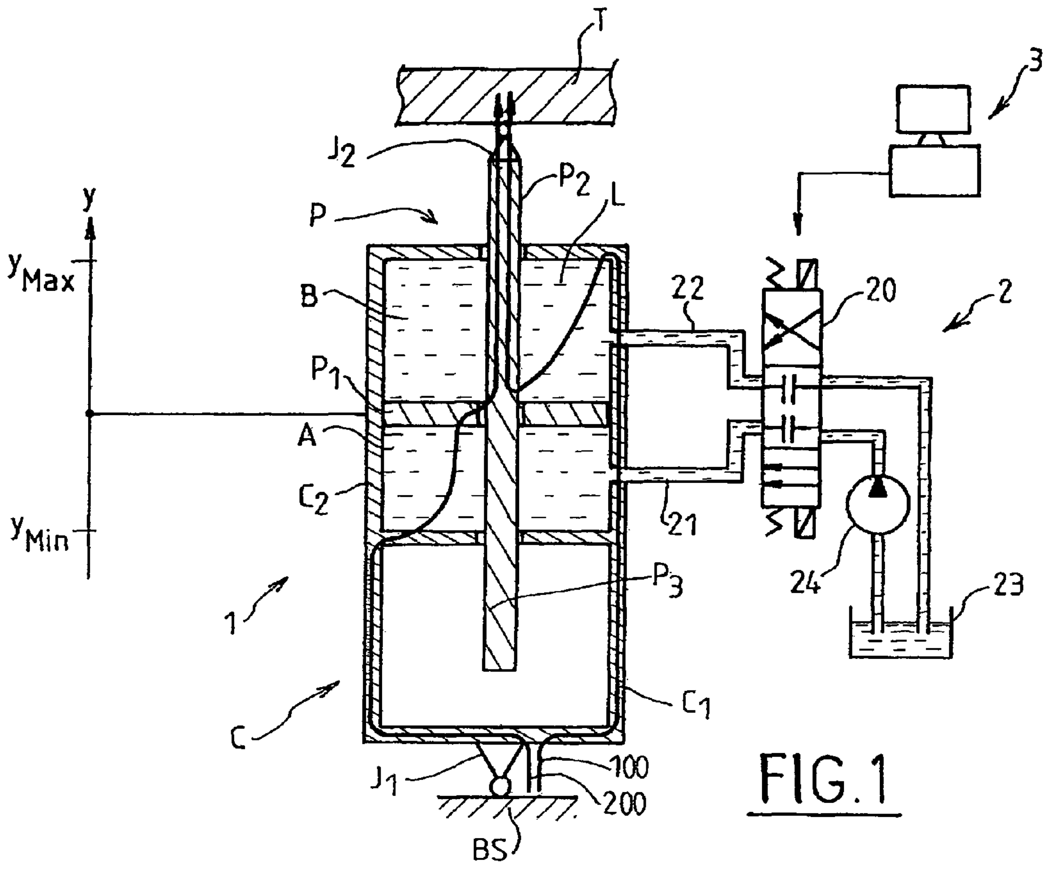
FIG.1
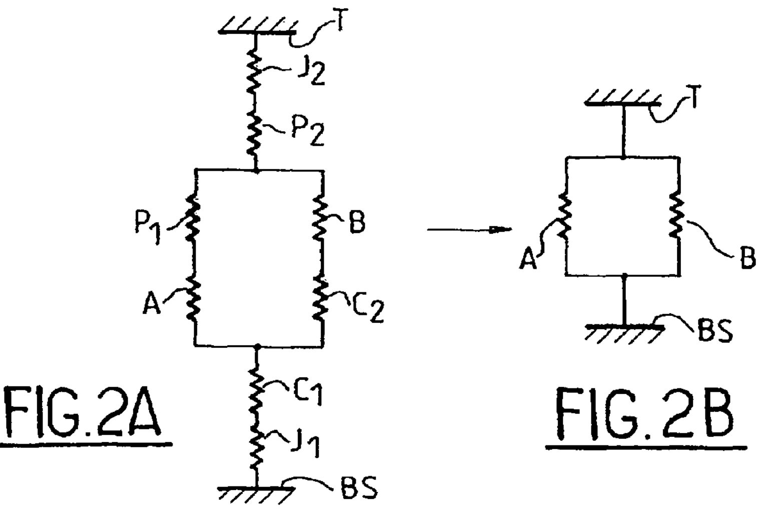
FIG.2A
FIG.2B

METHOD OF CONTROLLING A HYDRAULIC ACTUATOR

FIELD OF THE INVENTION

The invention relates to a method of controlling a hydraulic actuator to apply reciprocating excitation to a load. The invention applies in particular to carrying out mechanical vibration tests.

BACKGROUND OF THE INVENTION

In order to study the vibration behavior of structures, use is made of equipment that is constituted by a test bench fitted with one or more actuators enabling reciprocating motion of controlled frequency and amplitude to be imparted to said bench. Structures for testing are fastened to the bench, oscillatory excitation generated by said actuators is transmitted to the structures via the bench, and the response of the structures to said excitation is measured using accelerometers. Equipment of that type exists in very many variations: the structures for testing may present a very wide range of masses and dimensions (electronic cards weighing a few grams to mechanical structures weighing several (metric) tonnes), and they may need to be subjected to excitation at a very wide variety of frequencies and amplitudes.

In order to perform vibration tests on structures of large dimensions (several tonnes) at relatively low oscillation frequencies (generally less than 1 kilohertz (kHz)), use can be made of hydraulic actuators, such as double-acting jacks. Like any mechanical element, a hydraulic actuator presents finite stiffness; the assembly constituted by said actuator, the test bench, and the structure thus behaves like a coupled vibratory system constituted by the actuator(s), the bench, and the load. The finite stiffness of the actuator(s) affects (disturbs) the response of the system, particularly when the load is heavy. The effects of such coupling are numerous, complex, and harmful to the quality of the testing. One of the most awkward effects concerns the “suspension” mode of the system that is constituted by the load mounted on the actuator(s). From the point of view of vibration measurement, this mode does not correspond to dynamic behavior of the load in vibration, but to “parasitic” dynamic behavior coupling the load and the test installation. Furthermore, this very strong dynamic behavior makes it considerably more difficult to control excitation of the load. Depending on the mass of the load, the number of hydraulic actuators, and their respective stiffnesses, this resonant frequency sometimes lies within the frequency band of the test; this leads to very strong undesired coupling with the resonant modes of vibration of the structure, thereby disturbing measurement of its vibratory behavior. Furthermore, from the point of view of controlling the excitation, the lower the frequency of the suspension modes, the greater their amplitude, and the greater the difficulty for the installation in performing the specified tests, since that requires the installation to eliminate or greatly reduce the parasitic dynamic behavior.

OBJECT AND SUMMARY OF THE INVENTION

The present invention seeks to provide a solution to those problems by achieving a general reduction in the coupling between the load and the test installation.

The invention is based on detailed modeling of the parameters that determine the stiffness of a hydraulic actuator, and of the dynamic behavior of the system constituted by the test installation and the load. From this modeling, it results that the stiffness of the actuator is generally dominated by the contribution from the column of control liquid. The inventor has also determined that this dominant contribution depends on the operating point of the actuator. The invention makes use of this discovery by proposing to operate the actuator about an operating point that is selected in order to increase the stiffness of the column of control liquid.

More precisely, when considering an actuator comprising one or more hydraulic chambers and a movable member capable of moving between two extreme positions under the action of a control liquid (such as a jack), it is possible to show that the stiffness of the actuator increases with the movable member coming closer to either one of the two extreme positions. In accordance with the invention, an operating point is therefore selected that is significantly off-center relative to the mid-stroke position of the movable member.

The technique proposed by the invention is simple to implement, passive, and does not introduce any energy dissipation.

The invention thus provides a control method for controlling of a hydraulic actuator to impart oscillatory excitation to a load, the actuator comprising at least one hydraulic chamber and a movable member capable of moving in said chamber between two extreme positions under the action of a liquid under pressure, wherein the method comprises the steps consisting in: determining an operating point for said actuator, which operating point corresponds to a rest position of said movable member; applying a hydraulic command to bring said movable member into correspondence with said rest position; and applying a hydraulic command to cause said movable member to perform reciprocating movement about said rest position, said reciprocating movement being adapted to apply a desired excitation to said load; the rest position of said movable member being selected to be significantly off-center relative to said extreme positions.

Advantageously, the method may further include a step consisting in determining the amplitude of the movement of the movable member that is required to impart a desired excitation to said load; the rest position of the movable member being determined as a function of said movement amplitude. The idea is to avoid the movable member reaching the end of its stroke. Preferably, said rest position is selected to be as close as possible to one of said extreme positions of the movable member, taking account of the need to leave a buffer thickness of liquid between the movable member and an end-of-stroke abutment as required by the actuator’s safety requirements.

Said rest position may be selected in such a manner that the lowest resonant frequency of the actuator is higher than the frequency of said oscillatory excitation.

In a preferred embodiment of the invention, said hydraulic actuator has two hydraulic chambers of variable volume that are separated by said movable member, said chambers having volumes that are different when said movable member is taken to its rest position. More precisely, said hydraulic actuator may be a double-acting jack or a through-rod jack.

Under such circumstances, the two hydraulic chambers are connected to two respective hydraulic control circuits presenting unequal dead volumes; the rest position of the movable member being selected in such a manner that the hydraulic chamber of smaller volume is the chamber connected to the hydraulic circuit of smaller dead volume. The idea is to minimize the dead volume of actuating liquid, since it reduces the maximum stiffness of the actuator in non-negligible manner.

The invention also provides a method of testing a structure, the method comprising the steps consisting in:

fastening the structure to a test bench capable of being put into vibration by at least one hydraulic actuator;

defining a test protocol including applying vibration to said structure by means of said actuator via said test bench; and controlling said actuator to apply said vibration to the structure in accordance with said test protocol by using a control method as described above.

In particular, said vibration may present a frequency lying in the range 10 hertz (Hz) to 100 Hz with levels of acceleration lying in the range 10 milli-g and 10 g (where g is the acceleration due to gravity, and approximately equal to 9.81 meters per second per second ($m/s^2$)), for a structure of mass greater than 1 tonne.

BRIEF DESCRIPTION OF THE DRAWINGS

Other characteristics, details, and advantages of the invention appear on reading the following description made with reference to the accompanying drawings given by way of example and in which, respectively:

FIG. 1 is a highly simplified diagram of a through-rod jack arranged to impart oscillatory excitation to a test bench;

FIG. 2A shows a model of the various contributions to the axial stiffness of the FIG. 1 jack;

FIG. 2B shows an approximation to the model of FIG. 2A; and

MORE DETAILED DESCRIPTION

Figure 3:
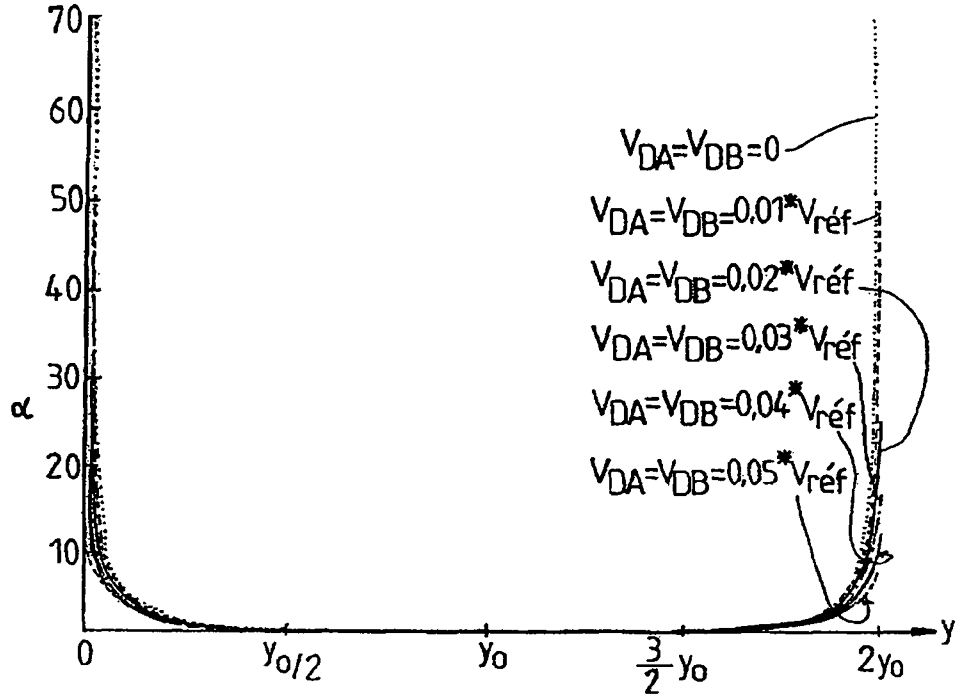
FIGS. 3 and 4 are graphs showing the influence of the operating point of the actuator on its axial stiffness.

FIG. 1 shows a hydraulic jack 1 mounted between a seismic block BS and a mechanical test bench T by means of two respective universal joints J1 and J2.

The jack 1 comprises a housing C within which a piston P moves.

The housing C comprises a bottom segment C1 fastened to the seismic block BS by the first universal joint J1, and a top segment C2 constituting a cylinder for containing an actuation liquid L under pressure (generally an oil).

The piston P comprises a plate P1 contained within the cylinder C2, with two rods P2 and P3 projecting from two opposite faces thereof. The top rod P2 leaves the cylinder C2 via a first sealed passage and it carries the second universal joint that connects the piston to the test bench T. The bottom rod P1 leaves the cylinder C2 via a second sealed passage and it penetrates into the first segment C1.

The plate P1 separates the inside volume of the cylinder C2 in leaktight manner into two hydraulic chambers A and B, each filled with said actuation liquid L.

The two hydraulic chambers A and B are connected via respective pipes 21 and 22 to a hydraulic control circuit 2 comprising a three-position, four-port control valve 20, a tank 23, and a pump 24.

When the valve 20 is in a first position (see figure), the pipes 21 and 22 are closed, and the control liquid does not flow. When said valve is taken to a second position, the chamber A is connected to the pump 24 via the pipe 21, while the chamber B is connected to the tank 23 via the pipe 22. Under such conditions, liquid is injected into the chamber A and is removed from the chamber B; consequently, the piston P moves upwards. Conversely, when the valve 20 is moved into a third position, the chamber A is connected to the tank and the chamber B to the pump, thereby causing the piston P to move downwards.

Thus, by acting on the pump 20, the axial movement of the piston P is controlled. By causing the valve to pass from the second position to the third position, and vice versa, it is thus possible to cause said piston to perform reciprocating motion, thereby imparting oscillatory excitation to the load constituted by the test bench T and by the structure under test that is fastened to said bench. It is also possible to move the piston P to a "rest" position and lock it in place by putting the valve in its first position where the circuit is closed.

To do this, the valve 20 is controlled by electronic means 3.

The position of the plate P1 of the piston P inside the cylinder C2 is written y. The stroke of the piston is limited, and consequently y necessarily lies between two extreme values $y_{min}$ and $y_{Max}$. When $y=y_{min}$, the piston is in its furthest off-center position in a downward direction; the volume of the chamber A is at a minimum (or even zero, if no end-of-stroke buffer or abutment is provided) while the volume of the chamber is at a maximum. Conversely, when $y=y_{Max}$, the piston is in its furthest off-center position in an upward direction; the volume of chamber A is at a maximum and the volume of the chamber B is at a minimum.

Normally, the actuator 1 is used around its central operating point at which $y=y_0=(y_{min}+y_{Max})/2$ in order to benefit from the greatest possible movement amplitude.

As mentioned above, the elements making up a real device present finite stiffness, i.e. they behave like springs. Specifically, what is most important is the stiffness of the actuator 1 in an axial direction.

Lines 100 and 200 in FIG. 1 show that there exist two paths for transmitting axial forces through the actuator 1.

The first path 100 passes via the first joint J1, the bottom segment C1 of the housing, the top segment C2, the liquid contained in the top hydraulic chamber B, the top rod P2 of the piston, and the second joint J2. The second path passes via the first joint J1, the bottom segment C1 of the housing, the liquid contained in the bottom hydraulic chamber A, the plate P1 of the piston, the top rod P2, and the second joint J2.

FIG. 2A shows a highly simplified model of the actuator 1, showing up the various contributions to its axial stiffness. In this model, each portion of the device is represented by a spring that is characterized by a stiffness value. The springs are connected in series or in parallel.

It should be recalled that if two springs of stiffnesses $k_1$ and $k_2$ are connected in series, the resulting stiffness is given by $(k_1 \times k_2)/(k_1+k_2)$, whereas if they are connected in parallel, their stiffnesses add together.

Consequently, when $k_1 \gg k_2$:

if the springs are connected in series, the resulting stiffness is substantially equal to $k_2$; and conversely, if the springs are connected in parallel, the resulting stiffness is substantially equal to $k_1$.

In a typical configuration (an actuator for the Hydra test bench of the European Space Agency, used for testing payloads), then the following numerical values apply:

$k_{J1} \approx k_{J2} \approx 2.4$ giganewtons per meter (GN/m)($10^9$ N/m);

$k_{C1} \approx 52$ GN/m;

$k_{C2} \approx 44$ GN/m:

$k_{P1} \approx 54$ GN/m;

$k_{P2} \approx 8.8$ GN/m;

$k_A \approx k_B \approx 0.125$ GN/m for $y=y_0=(y_{min}+y_{max})/2$.

Since $k_{J1} \ll k_{C1}$, $k_{J2} \ll k_{P2}$, $k_A \ll k_{P1}$, $k_B \ll k_{C2}$, and $k_{A,B} \ll k_{J1,J2}$, the diagram of FIG. 2A can be simplified as shown in FIG. 2B for actuation around the central position. At this operating point, the axial stiffness of the actuator is dominated by the axial stiffness of the chambers A and B.

The inventor has understood that the stiffness of the hydraulic chambers depends on the operating points of the actuator, i.e. on the position $\underline{y}$ of the piston relative to the housing.

To demonstrate this, it is necessary to start from the dynamic equations for the system constituted by the actuator 1 and its hydraulic control circuit 2.

Let S be the base surface area of the chambers A and B, and β the compressibility factor of the oil as defined by:

$$dV = \frac{V}{\beta} \cdot dP$$

where V is the volume, dV is an incremental variation in the volume, and dP is an incremental variation in pressure. Let $y_{min}=0$ and $y_0=y_{Max}/2$ (center position of the piston stroke); to provide a numerical example, assume that S=0.02 square meters ($m^2$), $\beta=1.09\times10^9$ pascals (Pa), and $y_0=0.1$ meters (m).

The volume of oil associated with the chamber A is $$V_A=S\cdot(y_0+y)+V_{DA}$$

where $V_{DA}$ is the "dead" volume associated with the pipe 21 and with certain portions of the valve 20. Likewise, $$V_B=S\cdot(y_0-y)+V_{DB}$$

The geometrical variation in volume due to a movement of the piston is given by:

$$\dot{V}_A=S\cdot\dot{y}$$

$$\dot{V}_B=-S\cdot\dot{y}$$

where the dot on a variable "" represents the operation of differentiating with respect to time.

To this geometrical variation there needs to be added the variation associated with the compressibility of the oil contained in each chamber:

$$Q_{OA} = V_A \cdot \dot{P}_A \cdot \frac{1}{\beta}$$

$$Q_{OB} = V_B \cdot \dot{P}_B \cdot \frac{1}{\beta}$$

where $P_A$ and $P_B$ represent pressure in the chambers A and B respectively.

If the flow of oil entering the chamber A (or chamber B) through the pump 24 and the valve 20 is written $Q_{SA}$ (or $Q_{SB}$), and the flow of oil leaving the chamber through the valve for reinjection into the tank 23 is written $Q_{TA}$ (or $Q_{TB}$), then the following can be written:

$$\begin{cases} \dot{V}_A + V_A \cdot \dot{P}_A \cdot \frac{1}{\beta} = Q_{SA} - Q_{TA} \\ \dot{V}_B + V_B \cdot \dot{P}_B \cdot \frac{1}{\beta} = Q_{SB} - Q_{TB} \end{cases}$$

from which the following can be deduced:

$$\begin{cases} \dot{P}_A = \frac{\beta}{V_A} \cdot (S \cdot \dot{y} + Q_{SA} - Q_{TA}) \\ \dot{P}_B = \frac{\beta}{V_B} \cdot (S \cdot \dot{y} + Q_{SB} - Q_{TB}) \end{cases}$$

The variation in the pressure difference between the two chambers is therefore given by:

$$\begin{aligned} \Delta\dot{P} &= -\left[\beta \cdot S \cdot \left(\frac{1}{V_A} + \frac{1}{V_B}\right)\right] \cdot \dot{y} + \\ &\quad \left[\frac{\beta}{V_A} \cdot (Q_{SA} - Q_{TA})\right] - \left[\frac{\beta}{V_B} \cdot (Q_{SB} - Q_{TB})\right] \\ &= -\frac{1}{S} k_T \cdot \dot{y} + f[\beta, V_A, V_B, (Q_{SA} - Q_{TA}), (Q_{SB} - Q_{TB})] \end{aligned}$$

in which the factor:

$$\begin{aligned} k_T &= \beta \cdot S^2 \cdot \left(\frac{1}{V_A} + \frac{1}{V_B}\right) \\ &= \beta \cdot S^2 \cdot \left(\frac{1}{S \cdot (y_0 + y) + V_{DA}} + \frac{1}{S \cdot (y_0 - y) + V_{DB}}\right) \end{aligned}$$

is said to be the "stiffness" of the oil since it determines the proportionality between the derivative of the force and the travel speed $\dot{y}$ of the piston. When the flow differences ($Q_{SA}-Q_{TA}$) and ($Q_{SB}-Q_{TB}$) are zero, then the following applies exactly:

$$\Delta\dot{P} = -\frac{1}{S} k_T \cdot \dot{y}$$

For small movements of the piston, P, $V_A$, and $V_B$ remain constant and it is possible to write:

$$F=S\cdot\Delta P=-k_T\cdot y$$

The oil column thus behaves like a spring (which was assumed without explanation in providing the diagrams of FIGS. 2A and 2B). If the mass of the load constituted by the test bench T and the structure that is attached thereto is written M, then the resonant frequency of the system represented by the diagram of FIG. 2B is given by:

$$\omega_0 = \sqrt{\frac{k_T}{M}}$$

Since the stiffness $k_T$ of the oil depends on the position $\underline{y}$ of the piston, it is possible to modify the resonant frequency by acting on the "rest" position about which the piston performs its reciprocating movement in order to generate the required oscillatory excitation.

More precisely:

when $\underline{y}$ approaches $y_{min}=0$ the volume of chamber A decreases (approaches zero if no end-of-stroke abutment or buffer is provided); the axial stiffness of the oil column increases by virtue of the dominant contribution of the chamber A; and conversely, when $\underline{y}$ approaches $y_{Max}=2y_0$, the volume of the chamber B decreases and the axial stiffness of the oil column increases because of the dominant contribution of the chamber B.

The increase in stiffness that can be obtained by selecting an operating point for the actuator that corresponds to an off-center rest position of the piston P is limited by the dead volumes $V_{DA}$ and $V_{DB}$ that do not depend on $\underline{y}$ and that can therefore become dominant.

The following can be written:

$$V_{ref}=S\cdot y_0=(V_A+V_B)/2$$

and $$V_{DA}=V_{DB}\gamma\cdot V_{ref}$$

and the parameter $\alpha(y)$ is defined as being the ratio between the stiffness of the oil when the piston P is in the position $\underline{y}$ and its stiffness when said piston is at half-stroke ($y=y_0$):

$$\alpha(y)=\frac{k_T(y)}{k_T(0)}$$

Figure 4:
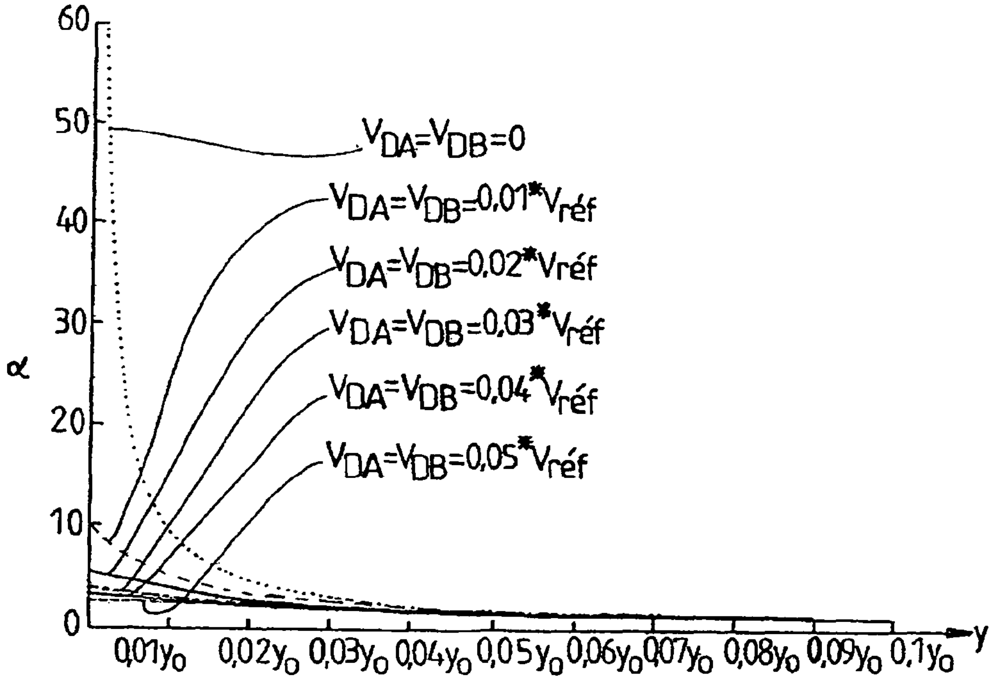

FIGS. 3 and 4 show how the value of $\alpha(y)$ increases as the piston approaches either one of its extreme positions ($y\rightarrow 0$ or $y\rightarrow 2y_0$) for various values of the parameter $\gamma$. In these figures, the abscissa axis represents the stroke of the actuator in percentage of the maximum stroke $y_0$. For $y\rightarrow 0$ or $y\rightarrow 2y_0$, $\alpha$ tends towards a maximum value $\alpha_{Max}$ that depends solely on the dead volumes, and therefore on the parameter $\gamma$. More precisely, the following applies:

$$\alpha_{Max}=\frac{(1+\gamma)^2}{\gamma\cdot(2+\gamma)}\approx\frac{1}{2\gamma}\text{ for }\gamma<<1$$

The following table shows how $\alpha_{Max}$ depends on $\gamma$. The third column of the table provides the value of $$\sqrt{\alpha_{Max}},$$

that represents the maximum increase in the resonant frequency of oscillation due to the stiffness of the oil.

| $\gamma$ | $\alpha_{Max}$ | $\sqrt{\alpha_{Max}}$ |
|---|---|---|
| 0 | +∞ | +∞ |
| 1% | 50.75 | 7.12 |
| 2% | 25.75 | 5.07 |
| 5% | 10.76 | 3.28 |
| 10% | 5.76 | 2.40 |
| 50% | 1.80 | 1.34 |
| 100% | 1.33 | 1.15 |

It can be seen that it is important to minimize dead volumes in order to be able to take advantage of the invention.

It should be observed that the dead volumes $V_A$ and $V_B$ normally have values that are practically equal in order to preserve symmetrical operations for the actuator. However, when the actuator is operating around an off-center rest point, it is only the dead volume associated with the smaller-volume chamber that influences axial stiffness (chamber A in the example). This makes it advantageous to modify the hydraulic control circuit of the actuator so as to make it asymmetrical, by bringing the control valve 20 as close as possible to said chamber. This is a relatively minor modification to the system, but it can have an effect that is highly significant.

Naturally, in practice, it is not possible to move the piston all the way to an end-of-stroke position, since under such circumstances reciprocating motion would no longer be possible. The rest position must therefore be selected so as to allow reciprocating motion of desired amplitude to take place without the piston coming into contact with the end of the cylinder or with an end-of-stroke abutment. While the actuator is in operation, it is advantageous for a buffer layer of oil to remain at all times between the plate P1 and the end of the cylinder, which layer has a thickness of a few millimeters.

In any event, it is clear that the resonant frequency of oscillation of the actuator cannot be increased indefinitely: once the stiffness of the oil exceeds the stiffness of the joints J1 and J2, it is the joints that dominate the actuator axial stiffness and drive the vibratory response of the system.

In addition to enabling the resonant frequency of vibration to be raised, preferably outside the excitation band of the load, the increase in the stiffness of the actuator makes it simpler to perform servo-control by reducing the phase delay introduced by the compressibility of the oil.

In accordance with the invention, and in order to maximize the axial stiffness of the device, the procedure is as follows.

Initially, the electronic control means 3 (specifically a computer) determine the amplitude of piston movement that is required for imparting desired excitation to said load. For example, in order to apply sinusoidal acceleration of 1 g (1 g=9.81 $M/s^2$) at 80 Hz it is necessary to have a movement amplitude of the order of 4 centimeters (cm). 5 millimeters (mm) is added thereto as the thickness of an oil buffer layer: the rest point of the piston about which the required sinusoidal reciprocating motion is performed is thus 4.5 cm from the extreme position, in other words: y=4.5 cm or $y=y_{Max}-4.5$ cm.

The computer 3 then acts on the valve 20 to bring the piston P to its rest position. It then controls said valve so as to give rise to the required reciprocating motion of the piston about said rest position.

In practice, it need not be necessary to select an operating point that maximizes axial stiffness (within the limits imposed by the amplitude required for the reciprocating movement). Depending on the type of vibration test that is desired, it can suffice merely to increase the axial stiffness of the actuator(s) in order to reject the "suspension" mode (or suspension modes for an installation having a plurality of degrees of freedom) of the system constituted by the bench and the load mounted on the actuator(s) to outside the excitation frequency band (or the frequency range for the test) so that the suspension motion takes place at a frequency higher than that of the oscillatory excitation that is to be applied to the load. For example, with this invention, it can be ensured that said resonant frequency is greater than the oscillatory excitation frequency by a factor of 1.5.

The invention is described above with reference to a two-chamber linear jack, but it can be applied equally well to any other hydraulic actuator that has a movable member capable of moving between two extreme positions in order to apply reciprocating or oscillatory excitation to a load, e.g. a single-chamber linear jack, or even a rotary jack.

What is claimed is:

1. A control method for controlling a hydraulic actuator to impart oscillatory excitation to a load, the actuator comprising at least one hydraulic chamber and a movable member capable of moving in said chamber between two extreme positions under the action of a liquid under pressure, wherein the method comprises the steps of:

determining an operating point for said actuator, which operating point corresponds to a rest position of said movable member;

applying a hydraulic command to bring said movable member into correspondence with said rest position; and applying a hydraulic command to cause said movable member to perform reciprocating movement about said rest position, said reciprocating movement being adapted to apply oscillatory excitation to said load;

the rest position of said movable member being selected to be significantly off-center relative to said extreme positions;

wherein said rest position is selected to be as close as possible to one of said extreme positions of the movable member.

2. A method according to claim 1, further including a step of determining the amplitude of the movement of the movable member that is required to impart said oscillatory excitation to said load; wherein the rest position of the movable member is determined as a function of said movement amplitude.

3. A method according to claim 1, wherein said hydraulic actuator is provided with two hydraulic chambers of variable volume that are separated by said movable member, said chambers having volumes that are different when said movable member is taken to its rest position.

4. A method according to claim 3, wherein said hydraulic actuator is a double-acting jack.

5. A method according to claim 3, wherein said hydraulic actuator is a through-rod jack.

6. A method according to claim 3, wherein the two hydraulic chambers are connected to two respective hydraulic control circuits presenting unequal dead volumes; the rest position of the movable member being selected in such a manner that the hydraulic chamber of smaller volume is the chamber connected to the hydraulic circuit of smaller dead volume.

7. A method of testing a structure, the method comprising the steps of:

fastening the structure to a test bench capable of being put into vibration by at least one hydraulic actuator;

defining a test protocol including applying vibration to said structure by means of said actuator via said test bench; and controlling said actuator to apply said vibration to the structure in accordance with said test protocol by using a control method according to claim 1.

8. A test method according to claim 7, wherein said vibration presents a frequency lying in the range 10 Hz to 100 Hz, for acceleration levels lying in the range 10 milli-g to 10 g, where g is the acceleration due to gravity on earth, for a structure of mass greater than 1 ton.

9. A control method for controlling a hydraulic actuator to impart oscillatory excitation to a load, the actuator comprising at least one hydraulic chamber and a movable member capable of moving in said chamber between two extreme positions under the action of a liquid under pressure, wherein the method comprises the steps of:

determining an operating point for said actuator, which operating point corresponds to a rest position of said movable member;

applying a hydraulic command to bring said movable member into correspondence with said rest position; and applying a hydraulic command to cause said movable member to perform reciprocating movement about said rest position, said reciprocating movement being adapted to apply oscillatory excitation to said load;

the rest position of said movable member being selected to be significantly off-center relative to said extreme positions;

wherein said rest position is selected in such a manner that the lowest resonant frequency of the actuator is higher than the frequency of said oscillatory excitation.

10. A method according to claim 9, further including a step of determining the amplitude of the movement of the movable member that is required to impart said oscillatory excitation to said load; wherein the rest position of the movable member is determined as a function of said movement amplitude.

11. A method according to claim 9, wherein said hydraulic actuator is provided with two hydraulic chambers of variable volume that are separated by said movable member, said chambers having volumes that are different when said movable member is taken to its rest position.

12. A method according to claim 11, wherein said hydraulic actuator is a double-acting jack.

13. A method according to claim 11, wherein said hydraulic actuator is a through-rod jack.

14. A method according to claim 11, wherein the two hydraulic chambers are connected to two respective hydraulic control circuits presenting unequal dead volumes; the rest position of the movable member being selected in such a manner that the hydraulic chamber of smaller volume is the chamber connected to the hydraulic circuit of smaller dead volume.

15. A method of testing a structure, the method comprising the steps of:

fastening the structure to a test bench capable of being put into vibration by at least one hydraulic actuator;

defining a test protocol including applying vibration to said structure by means of said actuator via said test bench; and controlling said actuator to apply said vibration to the structure in accordance with said test protocol by using a control method according to claim 9.

16. A test method according to claim 15, wherein said vibration presents a frequency lying in the range 10 Hz to 100 Hz, for acceleration levels lying in the range 10 milli-g to 10 g, where g is the acceleration due to gravity on earth, for a structure of mass greater than 1 ton.

17. A control method for controlling a hydraulic actuator to impart oscillatory excitation to a load, the actuator comprising at least one hydraulic chamber and a movable member capable of moving in said chamber between two extreme positions under the action of a liquid under pressure, wherein the method comprises the steps of:

determining an operating point for said actuator, which operating point corresponds to a rest position of said movable member;

applying a hydraulic command to bring said movable member into correspondence with said rest position; and applying a hydraulic command to cause said movable member to perform reciprocating movement about said rest position, said reciprocating movement being adapted to apply oscillatory excitation to said load;

the rest position of said movable member being selected to be significantly off-center relative to said extreme positions;

wherein said hydraulic actuator has two hydraulic chambers of variable volume that are separated by said movable member, said chambers having volumes that are different when said movable member is taken to its rest position; and wherein the two hydraulic chambers are connected to two respective hydraulic control circuits presenting unequal dead volumes; the rest position of the movable member being selected in such a manner that the hydraulic chamber of smaller volume is the chamber connected to the hydraulic circuit of smaller dead volume.

18. A method according to claim 17, further including a step of determining the amplitude of the movement of the movable member that is required to impart said oscillatory excitation to said load; wherein the rest position of the movable member is determined as a function of said movement amplitude.

19. A method according to claim 18, wherein said hydraulic actuator is a double-acting jack.

20. A method according to claim 18, wherein said hydraulic actuator is a through-rod jack.

21. A method of testing a structure, the method comprising the steps of:

fastening the structure to a test bench capable of being put into vibration by at least one hydraulic actuator;

defining a test protocol including applying vibration to said structure by means of said actuator via said test bench; and controlling said actuator to apply said vibration to the structure in accordance with said test protocol by using a control method according to claim 17.

22. A test method according to claim 11, wherein said vibration presents a frequency lying in the range 10 Hz to 100 Hz, for acceleration levels lying in the range 10 milli-g to 10 g, where g is the acceleration due to gravity on earth, for a structure of mass greater than 1 ton.

* * * * *